(No Model.)

J. S. KIDD.
SCOTCHING DEVICE FOR DUMPING PLATFORMS.

No. 511,021. Patented Dec. 19, 1893.

Witnesses:
M. P. Smith
R. H. Orwig

Inventor:
John S. Kidd
By Thomas G. Orwig, Attorney

UNITED STATES PATENT OFFICE.

JOHN S. KIDD, OF DES MOINES, IOWA.

SCOTCHING DEVICE FOR DUMPING-PLATFORMS.

SPECIFICATION forming part of Letters Patent No. 511,021, dated December 19, 1893.

Application filed January 20, 1891. Renewed July 27, 1893. Serial No. 481,660. (No model.)

*To all whom it may concern:*

Be it known that I, JOHN S. KIDD, a citizen of the United States of America, residing at Des Moines, in the county of Polk and State of Iowa, have invented a new and useful Wheel-Scotching Device for Wagon-Dumping Platforms, of which the following is a specification.

My invention relates to a wagon dumping platform adapted to support a loaded wagon and horses hitched to the wagon, and my invention consists in the arrangement and combination of levers adapted to engage the central portion of the wagon axle, and means for operating the levers, with a platform connected with a base in such a manner that it can be tilted and inclined to allow horses and a wagon to be advanced over its end, to remain thereon until the load is dumped from the wagon, and also in such a manner that a person at the side of the base that supports the tilting platform can readily operate the levers as required to be engaged and disengaged from the axle of the wagon.

Figure 1:
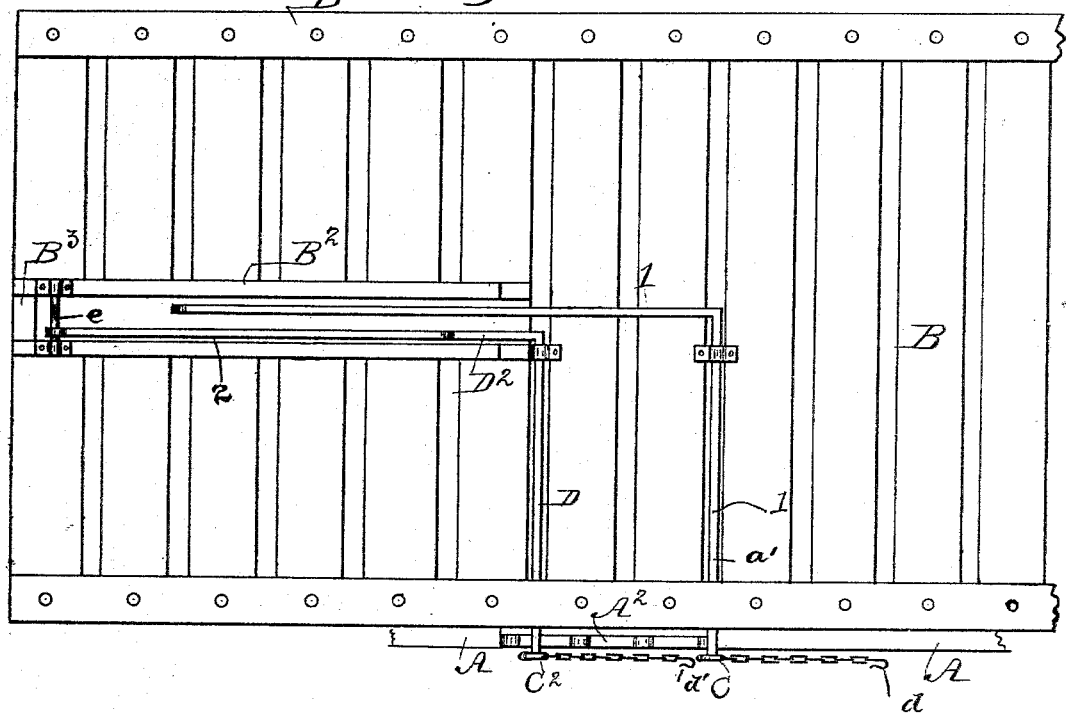
Figure 2:
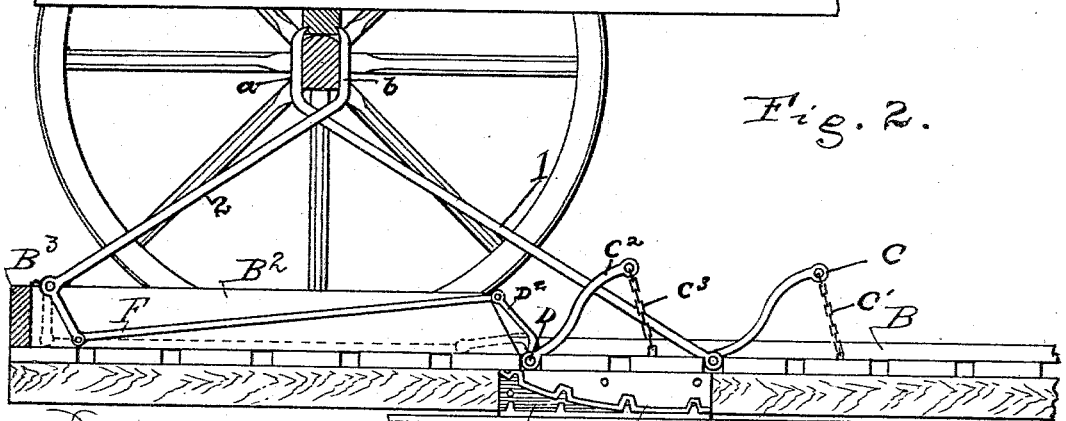

In the accompanying drawings—Figure 1 is a top view and Fig. 2 a side view of a portion of a tilting platform to which my invention is applied as required for practical use.

A represents a base that supports the platform, $A^2$, a plate fixed to the base, and $A^3$ a rocker fixed to the platform B. A corresponding plate and rocker are fixed to the opposite side of the base and platform in such a manner that the platform can be balanced into a level position, or tilted into an inclined position as required to allow horses and a wagon to ascend thereon.

$B^2$ are planks set on edge in parallel position to extend longitudinally with the central and end portions of the platform and rigidly fixed to the platform, by means of bolts, or in any suitable way.

$B^3$ is a cross piece fixed between the outer ends of the pieces $B^2$.

1 is an elbow-shaped lever pivoted to the platform. It has a jaw or hook $a$ at one end adapted to clasp around the rear side of a wagon axle, as shown in Fig. 2, to prevent the wagon from moving rearward when the platform is tilted and the rear wagon wheels are on an inclined plane. This lever has a horizontal portion $a'$ which extends laterally outward, through a groove or opening in the platform, and operates like a rock shaft to move the part that has the jaw or hook $a$ on its end.

C is a crank handle which is attached to the outer end of the horizontal portion of the lever. By means of the crank C the jaw or hook can be lifted to engage the wagon axle. A chain, C' or other suitable means for fastening the handle C to the platform, is attached to said handle and a hook $d$ on the end of the chain is adapted to engage a staple or eye (not shown), fixed to the platform.

2 is a lever that has a jaw or hook $b$ on its end adapted to engage the wagon axle. It is pivoted to a rod $e$ between the planks $B^2$ in such a manner that in its normal condition the lever will extend between them.

D is a rock shaft in bearings fixed to the platform, and extends parallel with the horizontal portion of the lever 1. It has a crank $D^2$ at its inner end that is connected with the short arm of the lever 2, by means of a rod F, in such a manner that the jaw or hook $b$ on the end of the long arm of the lever 2 can be brought into engagement with the front side of the wagon axle as required to prevent the horses, or any other cause, from moving the wagon forward. The handle $C^2$ on the outer end of the rock shaft D is fastened to the platform, by means of a chain $C^3$ and a hook $d'$, or in any suitable way.

In the practical use of my invention the end of the platform is put in an inclined position and a loaded wagon then advanced over the incline and the levers 1 and 2 actuated, by means of the handles C and $C^2$, as required to bring the jaws or hooks into reciprocal engagement with the wagon axle, as shown in Fig. 2. The wagon will thereby be securely scotched and prevented from backward or forward motion on the platform until the axle is released from the grip of the jaws on the ends of the levers 1 and 2.

I claim as my invention—

1. A wagon dumping platform having a pivoted connection with a base and adapted to allow horses and a wagon to ascend thereon, an elbow-shaped lever in bearings fixed to the top of the platform to allow the free portion of the lever to vibrate in a vertical plane at the central portion of the platform and to engage the central part of a wagon axle, to prevent the wagon from moving backward, an arm on the outer end of the horizontal part of the lever, and means for retaining the lever stationary when in engagement with a wagon axle, arranged and combined for the purposes stated.

2. A wagon dumping platform having an elbow-shaped lever fulcrumed to a bearing on the top and central portion of the platform to vibrate vertically and adapted to engage a wagon axle to prevent a forward motion of the wagon, a rock shaft in bearings on top of the platform and extending outward from the central portion of the platform and having an arm projecting at right angles from its inner end connected with said elbow-shaped lever, means for operating the rock shaft and elbow shaped lever connected therewith, and means for fastening the rock shaft when the lever is in engagement with the axle of a wagon, arranged and combined for the purposes stated.

3. In a wagon dumping platform, a pivoted or tilted section adapted to receive and support a loaded wagon, an elbow-shaped lever in bearings fixed to the said tilting section and adapted to allow its inner portion to vibrate in a vertical plane and to engage the axle of the wagon to prevent the wagon from moving backward, a second elbow-shaped lever fulcrumed to a support fixed to the top of the said tilting section and adapted to engage the axle of a wagon to prevent a forward motion of the wagon, a rock shaft in bearings fixed to the tilting section and extending horizontally from the central portion to the side thereof, a crank on the inner end of the rock shaft connected with the end of the lever that engages the wagon axle to prevent forward motion of the wagon, means on the outer end of the rock shaft to operate it, and means for retaining both levers stationary, when in engagement with the wagon axle, arranged and combined to operate in the manner set forth, for the purposes stated.

JOHN S. KIDD.

Witnesses:
S. C. SWEET,
THOMAS G. ORWIG.